United States Patent
Wojdyla

(10) Patent No.: US 11,021,897 B2
(45) Date of Patent: Jun. 1, 2021

(54) OVERTRAVEL HINGE

(71) Applicant: The Braun Corporation, Winamac, IN (US)

(72) Inventor: Adam D. Wojdyla, Winamac, IN (US)

(73) Assignee: THE BRAUN CORPORATION, Winamac, IN (US)

(*) Notice: Subject to any disclaimer, the term of this patent is extended or adjusted under 35 U.S.C. 154(b) by 0 days.

(21) Appl. No.: 16/895,038

(22) Filed: Jun. 8, 2020

(65) Prior Publication Data

US 2020/0300012 A1 Sep. 24, 2020

Related U.S. Application Data

(62) Division of application No. 15/792,907, filed on Oct. 25, 2017, now Pat. No. 10,676,974.

(60) Provisional application No. 62/416,246, filed on Nov. 2, 2016.

(51) Int. Cl.
| | | |
|---|---|---|
| *E06B 3/00* | (2006.01) | |
| *E05D 3/04* | (2006.01) | |
| *A61G 3/06* | (2006.01) | |
| *B60R 3/02* | (2006.01) | |
| *E05C 17/60* | (2006.01) | |

(52) U.S. Cl.
CPC .............. *E05D 3/04* (2013.01); *A61G 3/061* (2013.01); *A61G 3/062* (2013.01); *B60R 3/02* (2013.01); *E05D 13/04* (2013.01); *E05Y 2900/531* (2013.01)

(58) Field of Classification Search
CPC .......... E05D 3/04; E05D 13/04; A61G 3/061; A61G 3/062; E05Y 2900/531

USPC ......... 16/365, 366, 367, 368, 369, 370, 371; 49/360, 213, 506

See application file for complete search history.

(56) References Cited

U.S. PATENT DOCUMENTS

| | | | |
|---|---|---|---|
| 3,275,370 A | 9/1966 | Smith | |
| 4,114,318 A | 9/1978 | Brindle | |
| 4,664,584 A | 5/1987 | Braun et al. | |
| 5,180,275 A | 1/1993 | Czech et al. | |
| 6,317,925 B1* | 11/2001 | Pietryga | E05D 3/127 16/250 |
| 6,402,270 B1* | 6/2002 | Frank | A47F 3/005 16/366 |
| 6,647,592 B2* | 11/2003 | Presley | E05D 3/145 16/288 |
| 6,793,269 B2 | 9/2004 | Pugh | |
| 6,860,543 B2 | 3/2005 | George et al. | |
| 7,364,219 B2 | 4/2008 | Lowson et al. | |
| 7,816,878 B2 | 10/2010 | Heigl et al. | |
| 7,934,290 B2 | 5/2011 | Gherardi et al. | |
| 8,307,512 B2* | 11/2012 | Osaki | E05D 3/06 16/368 |
| 8,807,575 B2 | 8/2014 | Bartel et al. | |
| 9,476,246 B2 | 10/2016 | Fairchild | |

(Continued)

*Primary Examiner* — Jerry E Redman
(74) *Attorney, Agent, or Firm* — Taft Stettinius & Hollister LLP; Stephen F. Rost

(57) ABSTRACT

An overtravel hinge for a sliding door of a vehicle. The overtravel hinge expands from a collapsed condition, to a partially deployed condition, and to a fully deployed condition. The hinge includes a four bar linkage utilizing an arm to control movement of the overtravel hinge between the collapsed condition and the fully deployed condition. The overtravel hinge, in one embodiment, is used to modify or retrofit a known original equipment manufacturer vehicle.

7 Claims, 16 Drawing Sheets

(56) References Cited

U.S. PATENT DOCUMENTS

| | | | |
|---|---|---|---|
| 10,422,170 B2* | 9/2019 | Trentin | E05D 3/10 |
| 2005/0082871 A1* | 4/2005 | Anders | E05D 15/58 |
| | | | 296/155 |
| 2006/0267375 A1 | 11/2006 | Enomoto | |
| 2007/0062118 A1 | 3/2007 | Lindemann et al. | |
| 2009/0072583 A1 | 3/2009 | Elliott et al. | |
| 2009/0106940 A1* | 4/2009 | Greenbank | E05D 3/127 |
| | | | 16/367 |
| 2010/0001543 A1* | 1/2010 | Ertl | B60J 5/105 |
| | | | 296/50 |
| 2010/0289299 A1 | 11/2010 | Kitayama | |
| 2010/0295337 A1 | 11/2010 | Elliott et al. | |
| 2014/0248109 A1 | 9/2014 | Johnson et al. | |
| 2014/0356118 A1 | 12/2014 | Friedlinghaus et al. | |
| 2016/0201374 A1* | 7/2016 | Seto | E05D 15/1042 |
| | | | 49/360 |
| 2016/0362921 A1* | 12/2016 | Dey | E05D 3/127 |
| 2016/0362926 A1* | 12/2016 | Dey | E05F 5/06 |
| 2018/0119465 A1* | 5/2018 | Wojdyla | A61G 3/062 |
| 2018/0347246 A1* | 12/2018 | Dey | B60J 5/0479 |
| 2020/0165850 A1* | 5/2020 | Trentin | E05D 3/122 |

* cited by examiner

OVERTRAVEL HINGE

CROSS-REFERENCE TO RELATED APPLICATION

This application is a divisional application of U.S. patent application Ser. No. 15/792,907, now U.S. Pat. No. 10,676,974, filed Oct. 25, 2017, which claims the benefit of U.S. Provisional Patent Application Ser. No. 62/416,246, having the title "Overtravel Hinge" filed Nov. 2, 2016, the disclosures of which are hereby incorporated by reference in their entirety.

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example in one configuration, a van is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry and exit of the physically limited individual through what is known as the assisted entrance. Once inside the van, individual who uses the assisted entrance is located in a rear passenger compartment of the van adjacent to or behind the assisted entrance.

In one known retrofitted van, the sliding side door moves toward the back of the vehicle to open a passenger entrance as well as to provide access to a ramp located beneath the floor. In some vehicles, which are considered as viable candidates for retrofitting, the construction of the OEM vehicle requires significant modification to accommodate the addition of a ramp. Not only must a subfloor be added, but the door opening needs to be widened to provide access to a wheelchair. Consequently, what is needed is a modification to an OEM vehicle which reduces the amount of changes required to retrofit the OEM vehicle to provide access to individuals confined to a wheelchair or other mobility alternatives to wheelchairs.

SUMMARY

In one embodiment, there is provided a motor vehicle having a body. The motor vehicle includes a track mounted to the body wherein the track includes a first end and a second end. A door is adapted to move from a closed position to an open position. An extendable hinge is slidingly mounted to the track and is fixedly mounted to the door. The extendable hinge includes a collapsed first condition in the closed position of the door, a partially deployed condition between the first end and the second end of the track, and a fully deployed condition in the open position of the door. At the fully deployed condition, the position of the door is adjusted with respect to the body without further sliding movement of the hinge along the track.

In another embodiment, there is provided an extendable hinge for a door operatively coupled to a sliding mechanism configured to slide along a track of a passenger vehicle. The extendable hinge includes a first bracket adapted to couple to the door. A second bracket pivotably coupled to the first bracket. A third bracket pivotably coupled to the second bracket and an arm pivotably coupled to the first bracket and to the third bracket. The pivotable movement of the arm controls movement of the extendable hinge from a collapsed condition, a partially deployed condition, and a fully deployed condition.

In an additional embodiment, there is provided a vehicle door hinge for a door of a motor vehicle having a track configured to accept the door hinge for sliding movement of the door along the track. The door hinge includes an extendable hinge configured to slidingly mount to the track and fixedly mount to the door, wherein the extendable hinge includes: i) a collapsed condition at a first end of the track, ii) a partially deployed condition between the first end and a second end of the track, and iii) a fully deployed condition at the second end of the track. When the vehicle door hinge is in the fully deployed condition, the fully deployed condition further adjusts the position of the door with respect to the track without further sliding movement of the hinge along the track.

In still another embodiment, there is provided a method of opening a vehicle door moving along a track located along a side of the vehicle, wherein the track includes a first end at which the door is in a closed position and a second end at which the door is in an open position. The method includes: adjusting the position of the door by sliding the door along the track from the closed position at the first end of the track toward the second end of the track; and continuing to adjust the position of the door with respect to the track without further sliding movement of the door along the track at the second end of the track.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
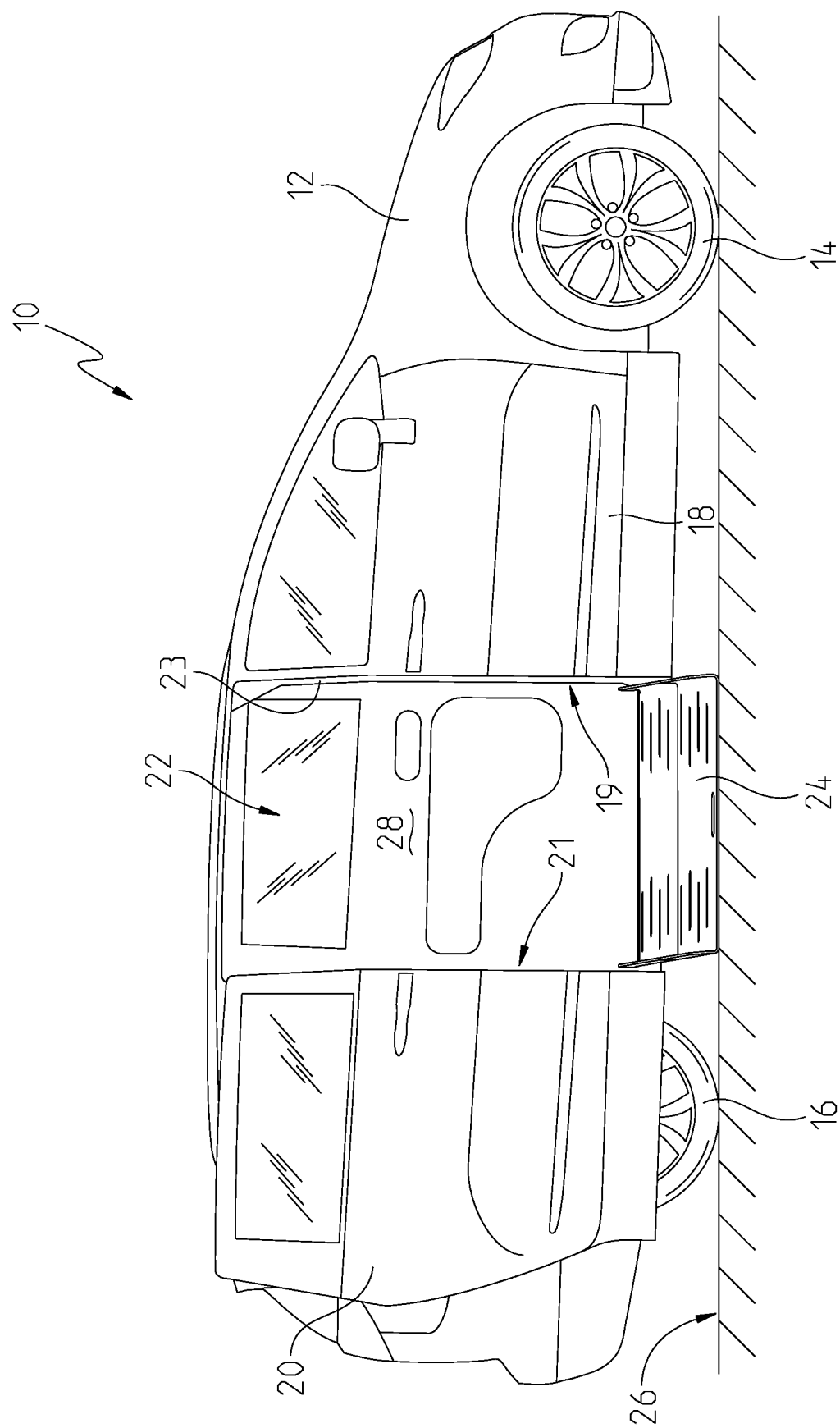
FIG. 1 illustrates an elevational side view of a passenger vehicle including an access ramp.

FIG. 1 illustrates a vehicle 10, commonly identified as a passenger van, available from any number of United States and foreign manufacturers. In the illustrated embodiment, the vehicle 10 includes a unibody construction, but other vehicles having a frame on body construction, are also included in the present disclosure. Consequently the use of vehicle herein includes all types and kinds of vehicles with a body on frame construction, a unibody construction, or other constructions. In addition, while the passenger van 10 is illustrated in FIG. 1, the present disclosure is directed to all passenger vehicles carrying one or more passengers.

The vehicle 10 includes a body 12 operatively coupled to front wheels 14 and rear wheels 16. The vehicle 10 includes a unibody construction. A first passenger side door 18 is located between the front wheels 14 and rear wheels 16 and provides access to a passenger for sitting in a front seat of the vehicle adjacent to the driver.

The vehicle 10 includes a second passenger side door 20 coupled to the unibody frame through a sliding mechanism including three tracks. Other numbers of tracks are possible. The sliding mechanism is modified to slide along the tracks to increase the size of an opening 22 to the interior. The widened opening 22 provides improved access to a passenger seated in a wheelchair. The opening is defined on the sides thereof by an edge 19 of a B-pillar 23 and the edge 21 of the door 20. The vehicle is further modified to include a ramp assembly 24 which provides rolling access of a wheelchair from pavement 26 into an interior 28 of the vehicle 10. The ramp assembly 24 is installed at the opening 22 and is movable between the interior of the vehicle, where it is stored in some embodiments, and to the exterior for wheelchair access.

In known modified vehicles, such as the modified van, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. As used herein, a wheelchaired passenger is used to indicate that the individual is making use of a wheelchair, whether that use is temporary or permanent.

Figure 2:
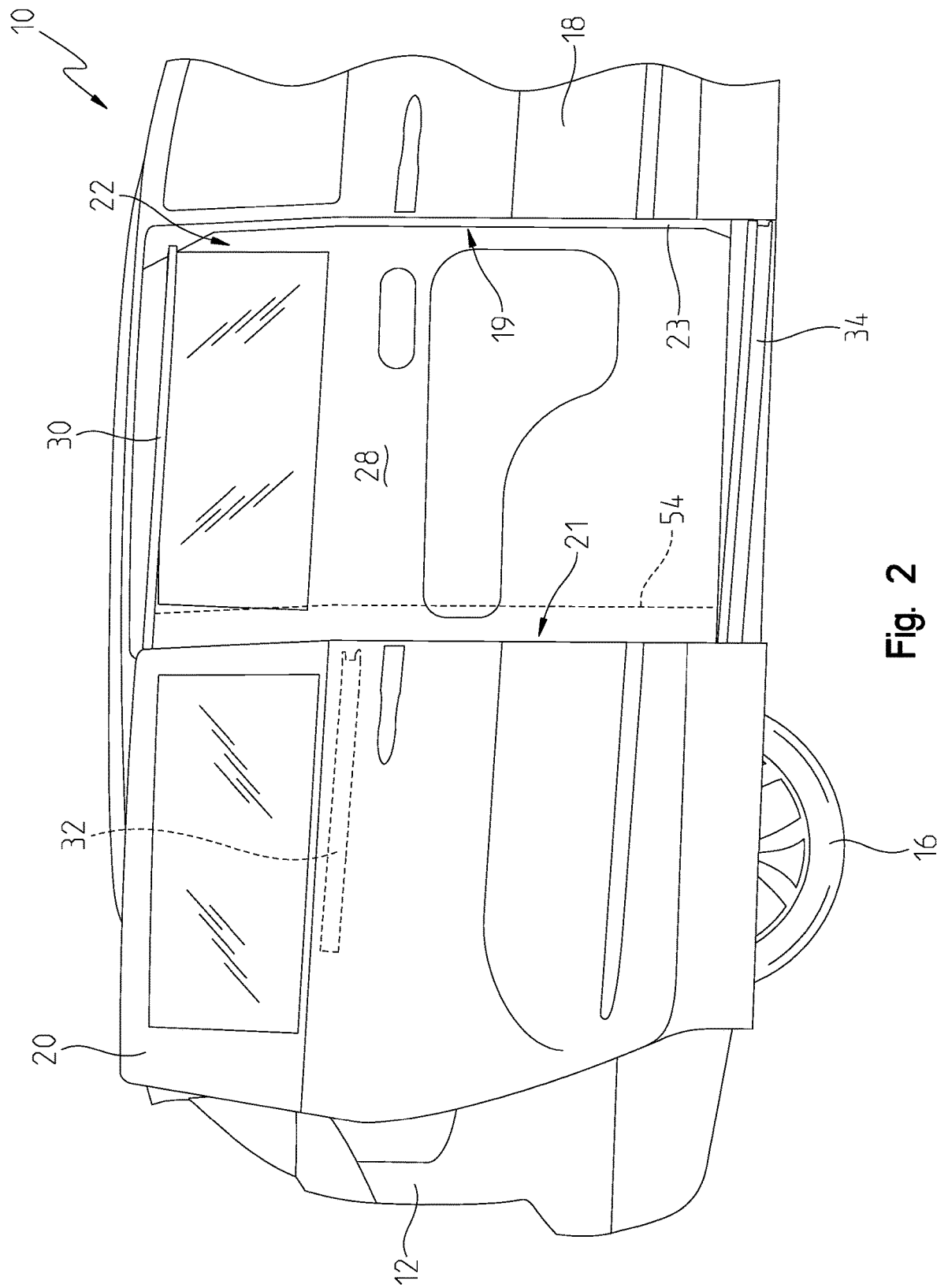
FIG. 2 illustrates an elevational side view of a passenger vehicle having a first, second, and third track adapted to provide for sliding movement of a door from a closed position to an open position.

As can be seen in FIG. 2, the vehicle 10 includes a first track 30, a second track 32, and a third track 34, each of which is adapted to provide sliding movement of the door 20 from a closed position to an open position and back to a closed position as is understood by those skilled in the art. In one embodiment, an upper portion of the body 12 supports the track 30 and a lower portion of the body 12 supports the track 34. The track 32 is supported by the body but is located, in one embodiment, at a bottom portion of a side window.

Figure 3:
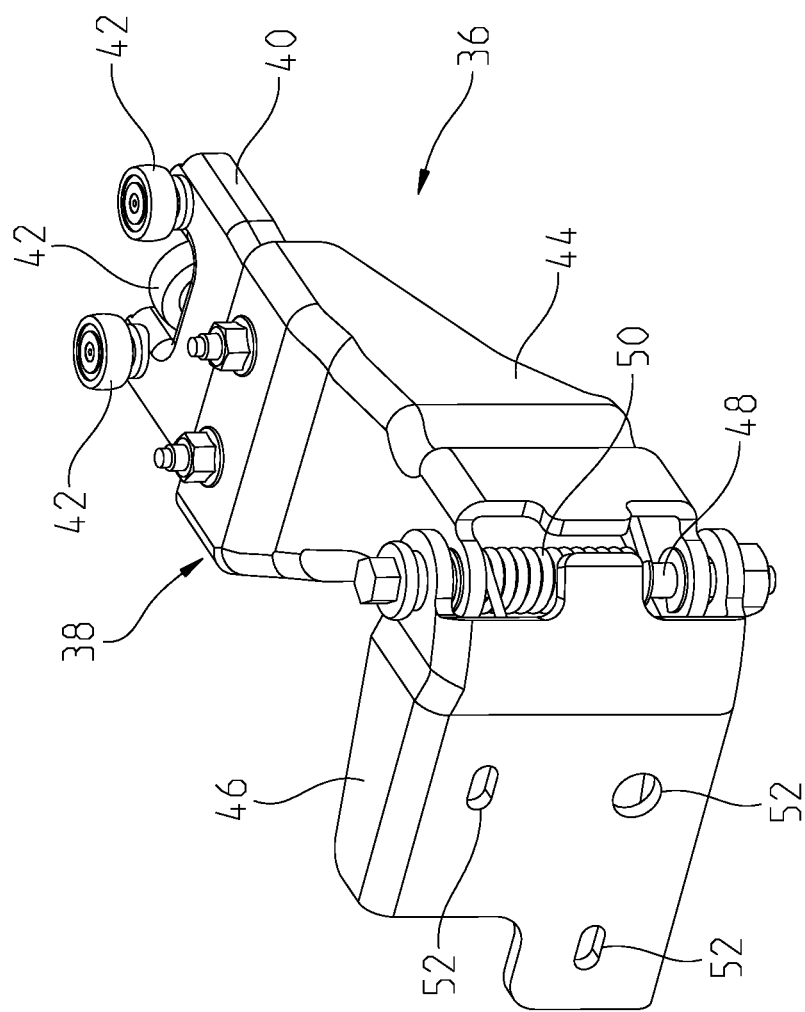
FIG. 3 illustrates a perspective view of a prior art door hinge.

In an OEM door, a sliding door hinge 36, such as the prior art sliding door hinge 36 of FIG. 3, is coupled to an interior of the door 20 and is slidingly coupled to one or more of the first track 30, the second track 32, and the third track 34. The sliding door hinge 36 includes sliding member 38 having a first part 40 which engages a track with a plurality of roller bearings 42. The sliding member 38 includes a bracket support 44, coupled to the first part 40, to locate the door 20 at an appropriate distance from the body 12 of the vehicle 10. A door bracket 46 is rotatably coupled to the bracket support 44 at a pin 48 which enables pivotable movement of the bracket 46 about an axis defined by the pin 48 with the bracket support 44. A spring 50 provides a predetermined amount of tension between the bracket support 44 and the door bracket 46 to reduce play between the two brackets. The door bracket 46 includes a plurality of apertures which provides openings for connectors to engage the sliding door hinge 36 to an inside of the door 20.

In an OEM vehicle, three sliding door hinges are coupled to the inside of the door 20 and each engage one of the tracks 30, 32, and 34. The sliding door hinge 36 is typically located at the middle track 32. Different types of sliding door hinges are configured to engage the tracks 30 and 34. When the described hinges are used in the OEM vehicle, however, the size of the opening 22 is established between the edge 19 of the B-pillar 23 and the edge 21 of the door 20 which can open no further than a location 54 as illustrated by the dotted line in FIG. 2. In this OEM configuration the size of the door opening 22 is insufficient to provide adequate access to a wheelchaired individual. In one embodiment, the door 22 is opened manually by an individual. In another embodiment, the door 22 is a powered sliding door which moves along the track powered by sliding door motor (not shown) located in the door.

Figure 4:
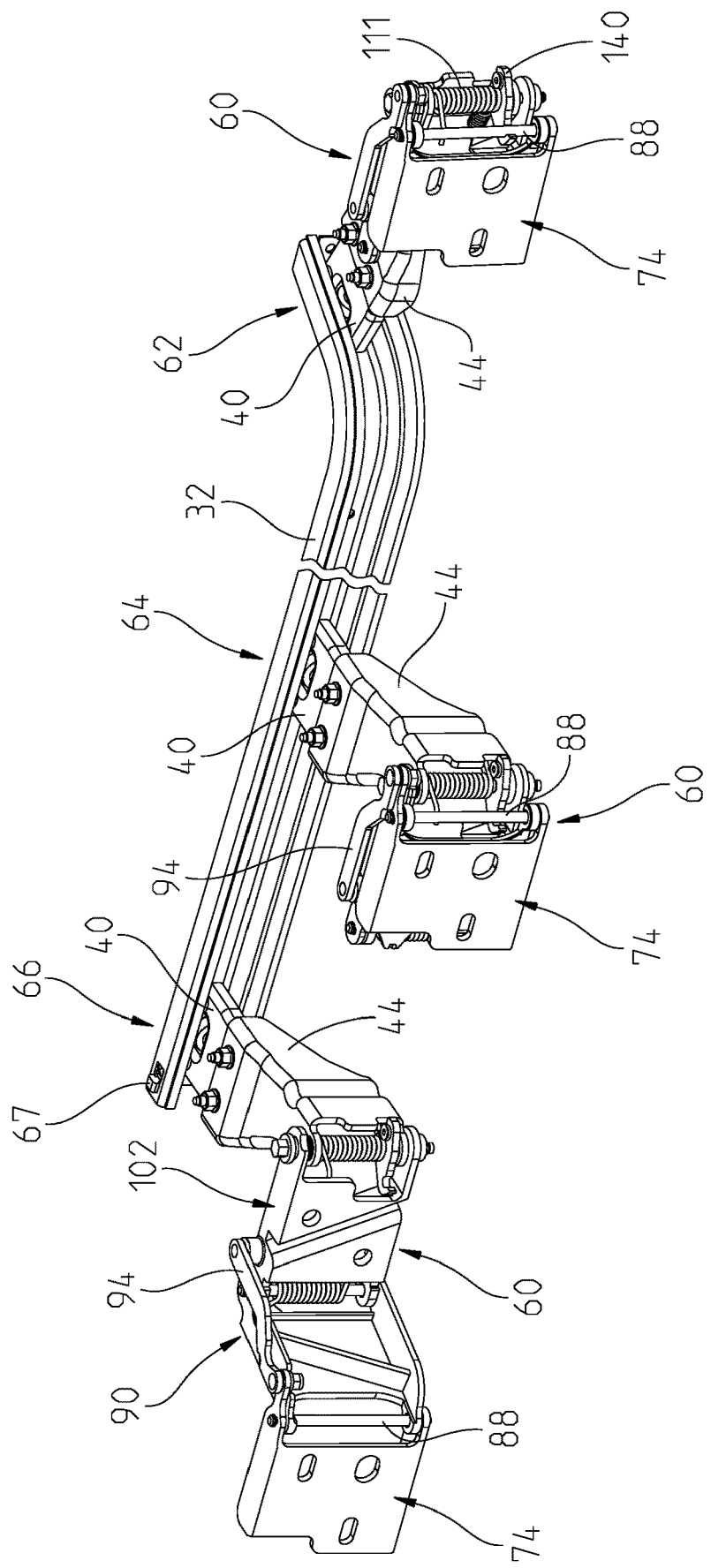
FIG. 4 illustrates a perspective view of an extendable hinge in a first, second, and third position with respect to door track.

To provide an increased access area of the door opening 22, an extendable hinge 60, as illustrated in FIG. 4, slidingly engages one, some, or all of the tracks 30, 32, and 34. For purposes of the present disclosure, the track 32 is discussed. In other embodiments, a single extendable hinge 60 is used at the middle track 32 and other hinges, not necessarily the prior art hinge of FIG. 3, are used.

FIG. 4 illustrates the extendable hinge 60 at different locations of the track 32 as the door is moved from the closed position to the open position. In a first position 62 at a terminating end of the track 32, the hinge 60 is in a collapsed condition, or fully closed condition. At this position, the door is closed. In a second position 64, the hinge 60 is in a partially deployed condition, or partially open condition. In a third position 66, the hinge is in a fully deployed condition, or fully open condition. At this position, the door is fully open. A stop 67 is located at the end of the track 32 to stop the extendable hinge from traveling further along the rail 32. This stop defines the extent of the open position of the door, which is increased by the extendable hinge. In this embodiment, the extendable hinge 60 is operatively connected to the bracket support 44 which is coupled to the first part 40, which engages the track 32. In other embodiments, one or both of the first part 40 and the bracket support 44 are not an OEM part, but are parts specifically adapted to mate with the extendable hinge 60.

Figure 5:
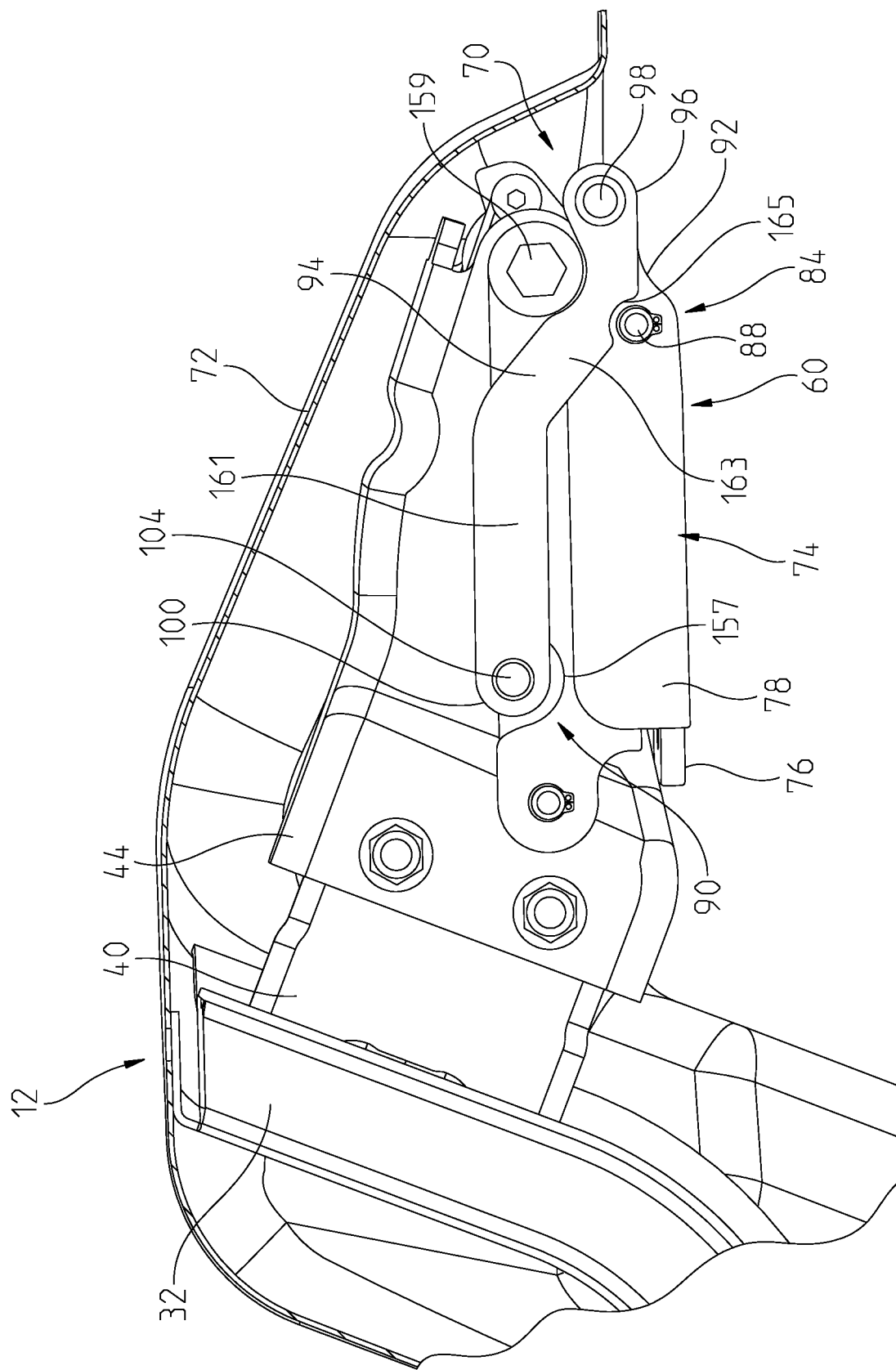
FIG. 5 illustrates a top view of an extendable hinge in a collapsed configuration located in a recess of a vehicle pillar.
Figure 6:
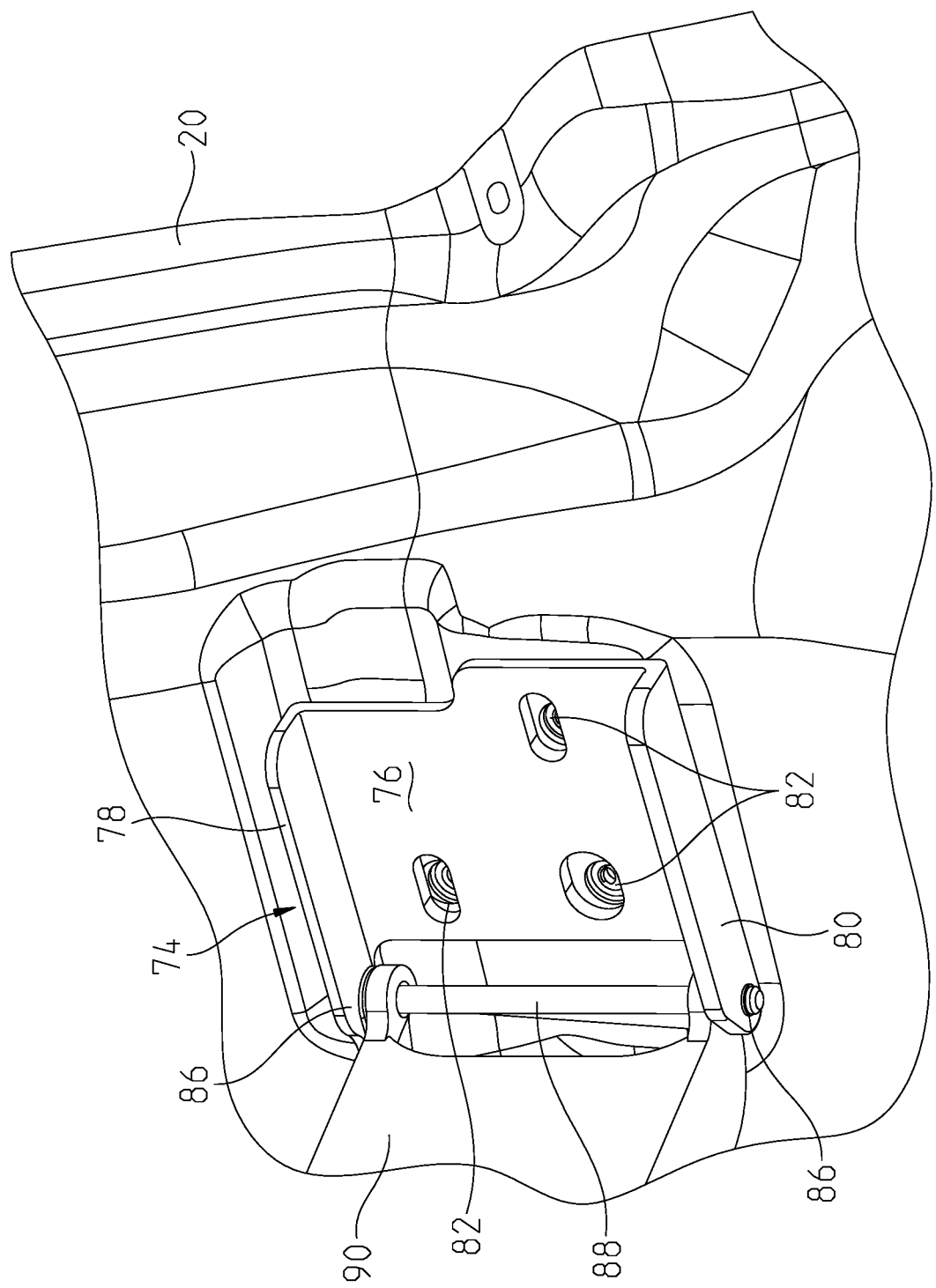
FIG. 6 illustrates a perspective view of a portion of an extendable hinge operatively connected to an inside of a vehicle door.

In the first position 62, the extendable hinge 60 is located in a cavity 70 defined by a body pillar 72 of the body 12 as illustrated in FIG. 5. In one embodiment, the cavity 70 is located in what is generally known as a C pillar. As seen in this top view and in FIG. 4, the extendable hinge 60 includes a first bracket 74 formed to attach to an inside of the door 20 as illustrated in FIG. 6. The bracket 74 includes a plate 76 having terminating sides 78 and 80 inclined with respect to the plate 76 to provide a relatively rigid structure. The plate 76 includes a plurality of apertures 82 adapted to receive fasteners or connectors to couple the extendable hinge 60 to the door 20.

An end 84 of the bracket 74 includes first and second apertures 86 disposed in the terminating sides 78 and 80 which capture a pin 88. The pin 88 extends through the apertures 86 and into a second bracket 90 to pivotally couple the second bracket 90 to the fixed first bracket 74. While not apparent from FIG. 6, the first bracket 74 includes a finger or extending portion 92, which extends past the pin 88. See also FIGS. 7A-7D. While the side 78 includes the finger 92, the other side 80 does not.

An arm 94 extends along the extendable hinge 60 when the hinge is in the collapsed condition. As seen in both FIG. 5 and in FIG. 7A, a first end 96 of the arm 94 is pivotally coupled to the finger 92 with a connector 98. A second end 100 of the arm 94 is pivotally coupled to a third bracket 102 with a connector 104. The pivotable coupling of the arm 94 at the end 100 is located between a first end 106 and a second end 108 of the third bracket 102. The third bracket 102 is pivotally coupled to the bracket support 44 with a pin 110. The pin 110 extends through a spring 111, a terminating end 112 of the bracket support 44, and through a first side 114 and a second side 116 of the third bracket 102. The first side 114 and the second side 116 are coupled to an intermediate plate 118. In one embodiment, the first side 114, the second side 116, and the intermediated plate 118 are all one casting. In another embodiment, the first side 114, the second side 116, and the intermediated plate 118 are separate components fixedly coupled together.

The first end of the bracket 102 is pivotally coupled to the bracket 90 with a pin 120. The pin 120 extends through a spring 121, the first and second sides 114 and 116 of the third bracket 102, and a first side 122 and a second side 124 of the second bracket 90. The first side 122 and second side 124 are separated by and coupled to a plate 125. In one embodiment, the first side 122, the second side 124, and the plate 125 are all one casting. In another embodiment, the first side 122, the second side 124, and the plate 125 are separate components fixedly coupled together.

Figure 7A:
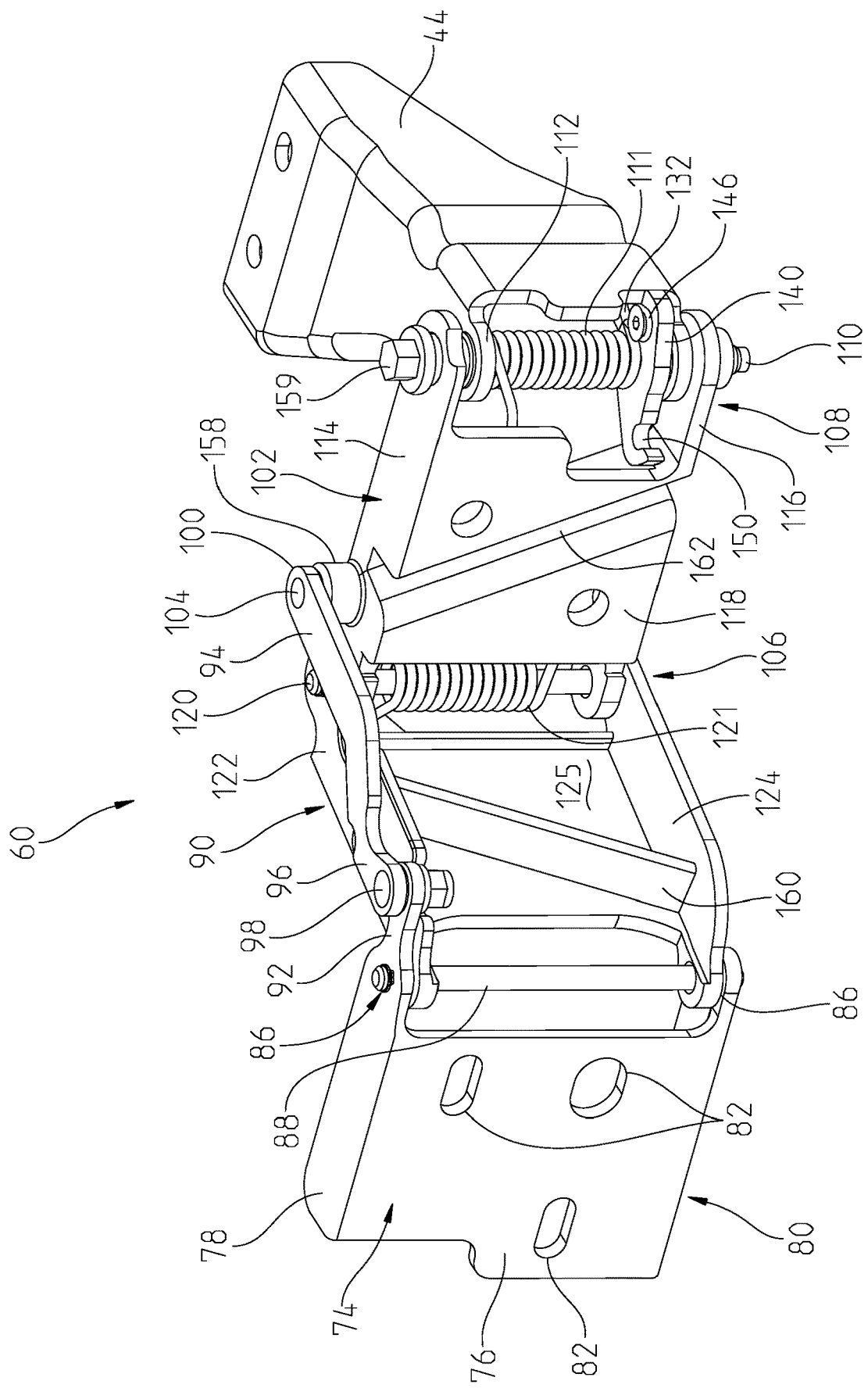
FIGS. 7A, 7B, 7C, and 7D illustrate perspective views of the front and back of an extendable hinge in different states of operation.
Figure 7B:
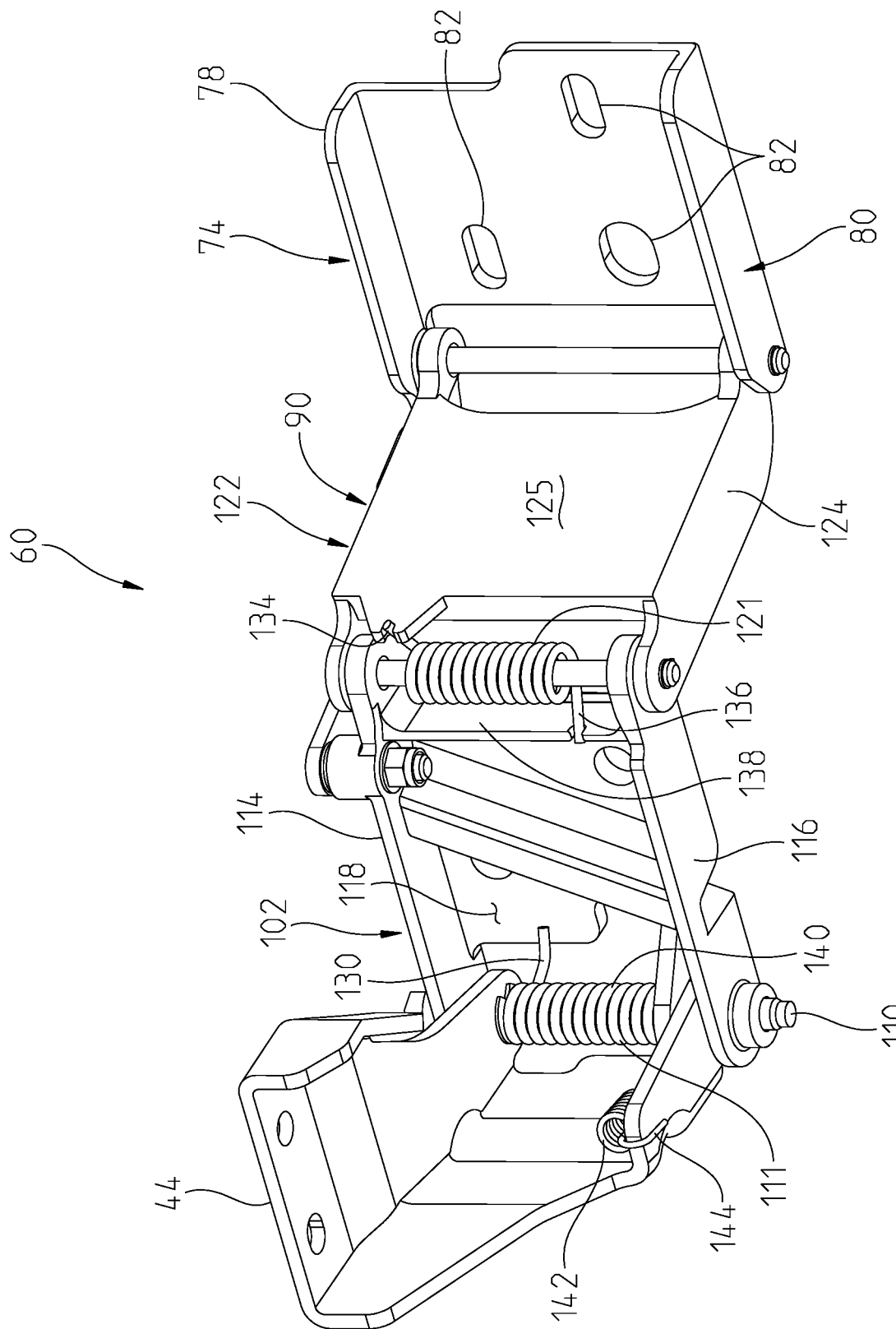

FIG. 7B illustrates a back view of the extendable hinge 60 in the fully deployed condition. The spring 111 includes a first terminating end 130 which engages the plate 118 and a second terminating end 132 which engages a portion of the bracket support 44. See FIG. 7A. The spring 121 includes a first terminating end 134 which engages a notch in the plate 125. A second terminating end 136 engages a notch located in a sidewall 138 of the third bracket 102. Each of the springs 111 and 121 provides a predetermined amount of spring tension to the respective first, second, and third brackets 74, 90, and 102 to reduce or prevent the appearance of play or slop when the extendable hinge 60 moves from the collapsed condition to the fully deployed condition and back to the collapsed condition.

As seen in both FIGS. 7A and 7B, a latch 140 is mounted on the pin 110 on one side of the spring 111. The latch 140 is spring biased about the pin 110 by a spring 142 which includes a first terminating end 144 operatively connected to the bracket support 44. A second end 146 of the spring 142 is coupled to an end of the latch 140 with a connector 141. The latch 140 is therefore biased in a counterclockwise direction as shown in FIG. 7A. The latch 140 includes a notch 150 having a predetermined size which is sufficient to capture the pin 88 as further illustrated in FIG. 7C.

Figure 7C:
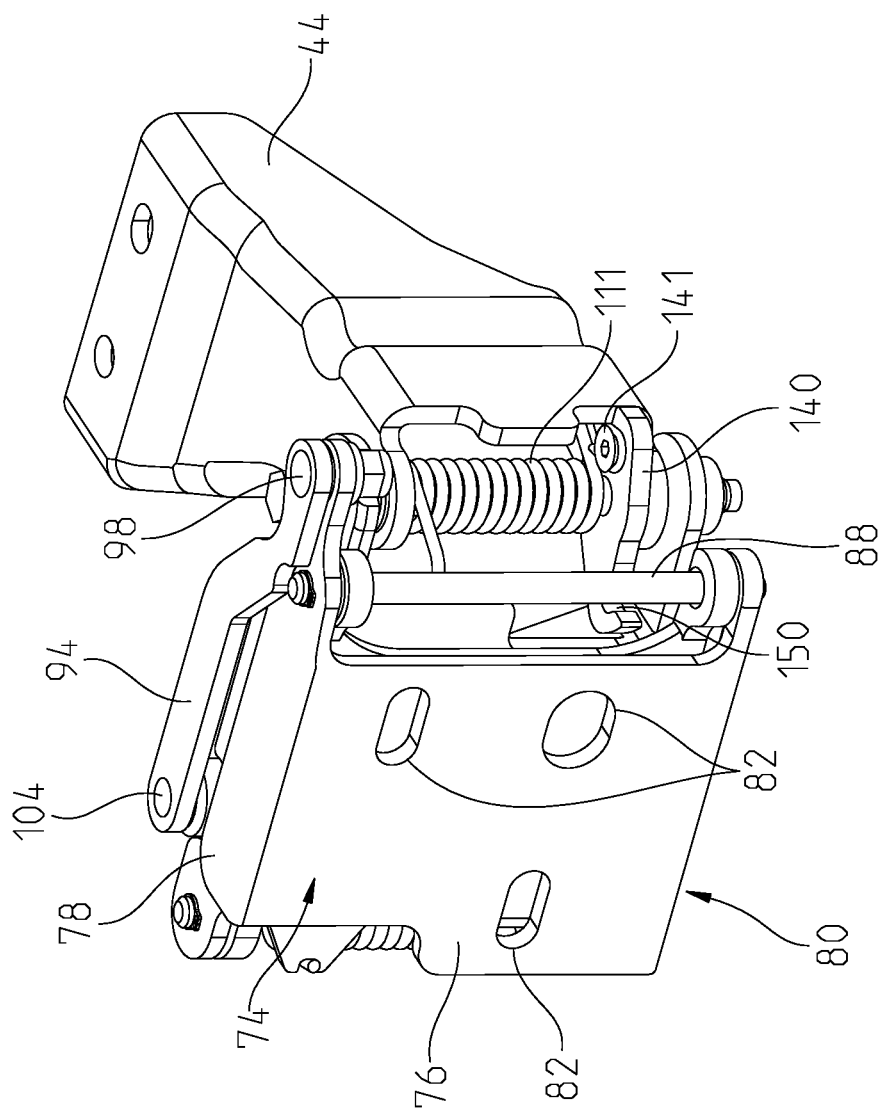
Figure 7D:
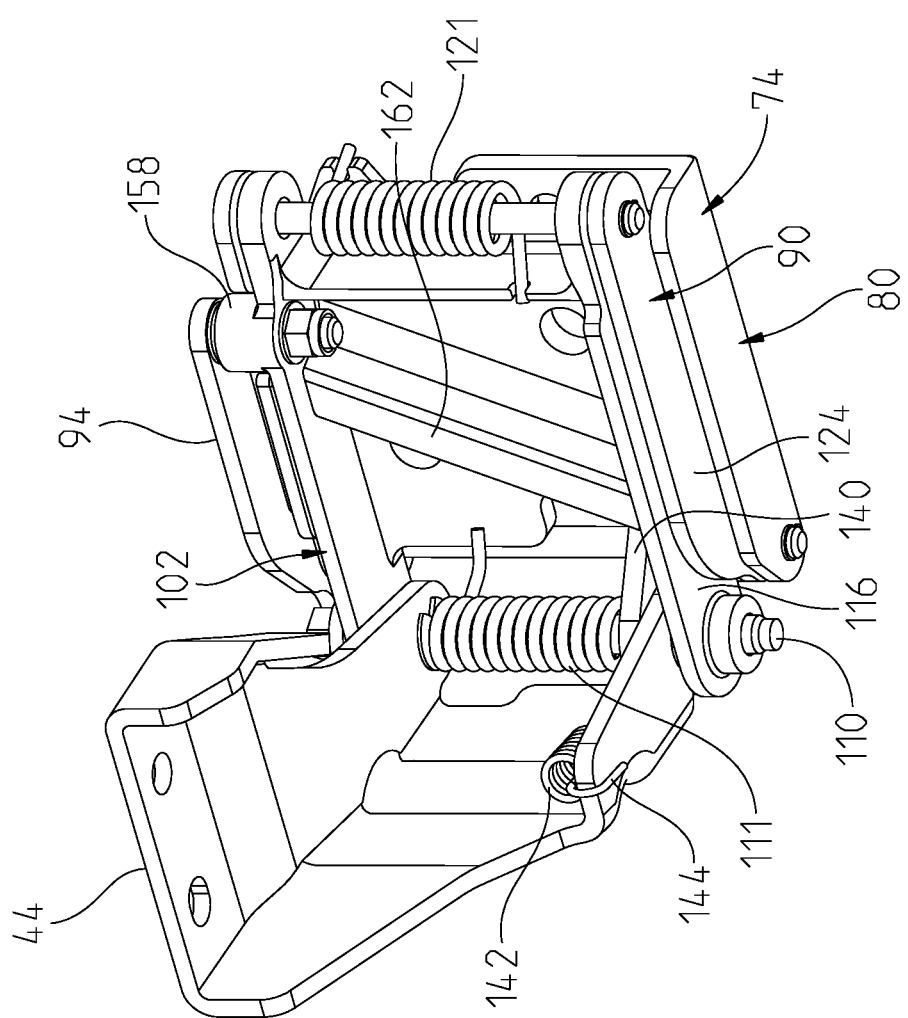

FIG. 7C illustrates the partially deployed condition 64 of FIG. 4 and FIG. 7D illustrates a back view of the partially deployed condition 64. In this condition, the each of the brackets 74, 90, and 102 are aligned substantially in parallel just prior to being fully collapsed in the collapsed condition 62. In this partially deployed condition, the latch 140 is positioned such that the notch 150 is located at a position just before engaging the pin 88. As the door 20 is moved toward the closed position, the latch 140 fully engages the pin 88 and pulls the pin 88 toward the car body 12 and into a fully latched position which seals the door to the body 12. The finally engaged position of the latch 140 with the pin 88 can be seen in FIG. 4 at the collapsed position 62.

As more clearly seen in FIG. 7A, the second bracket 90 includes a rib 160 which is coupled to the top wall 122 and the bottom wall 124. The rib 160 is inclined with respect to the planes of each of the walls 122 and 124 and extends from each to provide structural support for the second bracket 90. To provide for the substantially parallel orientation for each of the first, second, and third brackets 74, 90, and 102, the third bracket 102 includes an inclined recess 162, which is configured to receive the rib 160 when the extendable latch 60 is in the collapsed condition. Not only does this enable each of the brackets to collapse and to fit within the cavity 70 of the pillar 72, but it also provides for a nesting of parts such that a close fit between parts is provided to reduce any noise that could result if the parts were not so aligned.

As is also illustrated in FIG. 7D, each of the first, second, and third brackets 74, 90, and 120 include plates of different heights such that the top and bottom walls of each bracket nest without interfering with another bracket when collapsed. For instance, the bottom wall 116 of the third bracket 102 is disposed adjacently to the bottom wall 124 of the second bracket 90. The bottom wall 124 of the second bracket 90 is disposed adjacently to the bottom wall 80 of the first bracket 74. Top walls of each of the brackets are similarly adjacently disposed.

As is also illustrated in FIG. 7D, a standoff 158 is located between the end 100 of the arm 94 and the top plate 114 of the third bracket 102. To enable the second bracket 90 to nest with the third bracket 102, the top wall 122 of the second bracket 90 includes a cutout 157 shown in FIG. 5. The arm 94 is also configured to nest with a nut 159, one of the parts used to hold the pin 110 in place. To enable nesting of the arm 94 with the nut 159, the arm 94 includes a first section 161, coupled to the connector 104, and a second section 163 which extends from the first section at an angel of other than 180 degrees to interface with the nut 149. The second section 163 also includes a cutout 165 which is configured to interface with the pin 88.

The arm 94 provides one link of a four bar linkage which includes as the other links: a) the finger 92, between the pin 88 and the connector 98; b) the second bracket 90, between the pin 88 and the pin 120, and c) a portion of the third bracket 102, between the pin 120 and the connector 104. The arm 94 is used to control movement of the overtravel hinge 60 between the collapsed condition and the fully deployed condition.

Figure 8:
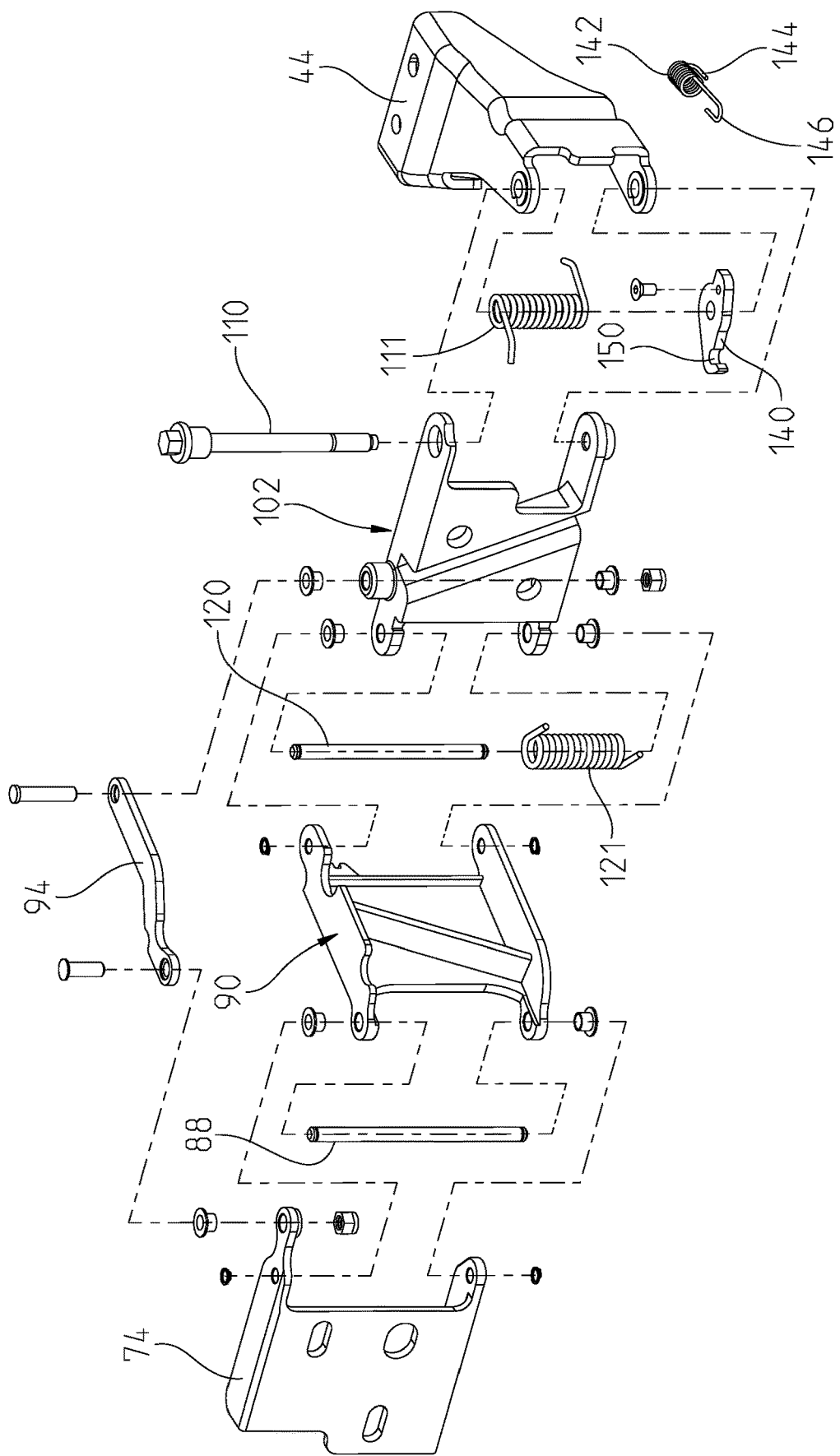
FIG. 8 illustrates an exploded view of an extendable hinge.

FIG. 8 illustrates an exploded view of the bracket support 44 and the extendable hinge 60. Additional parts, including a washer, inserts, standoffs, and nuts are shown to complete the assembly of the bracket support 44 and extendable hinge 60.

Figure 9:
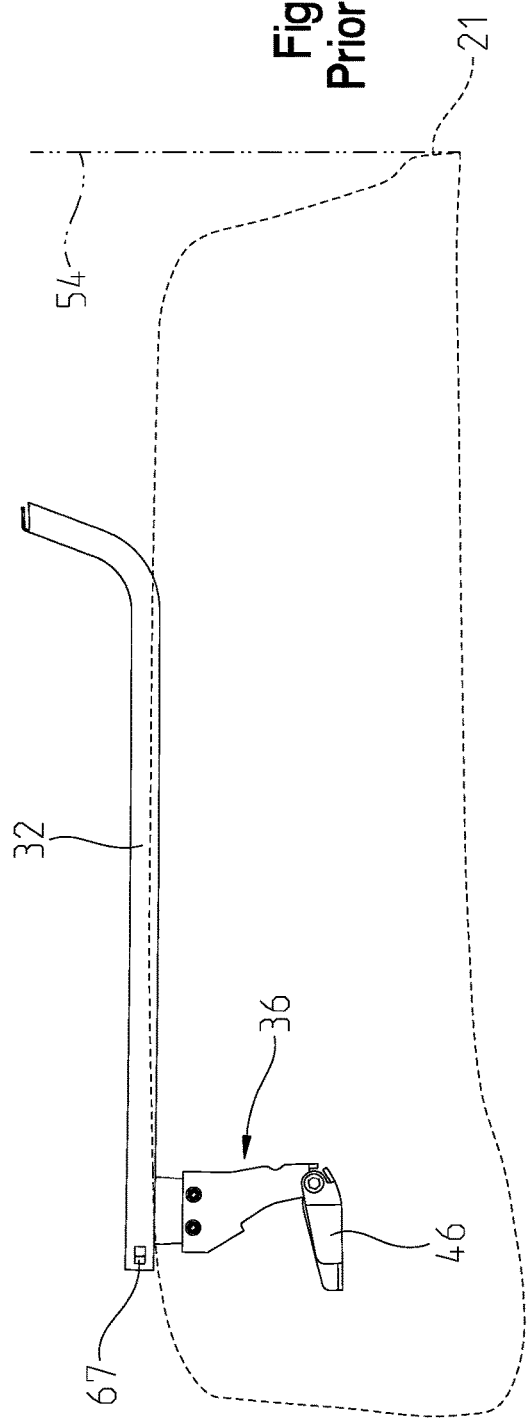
FIG. 9 illustrates a diagrammatic top view of a prior art door hinge located an end of travel of a door track.
Figure 10:
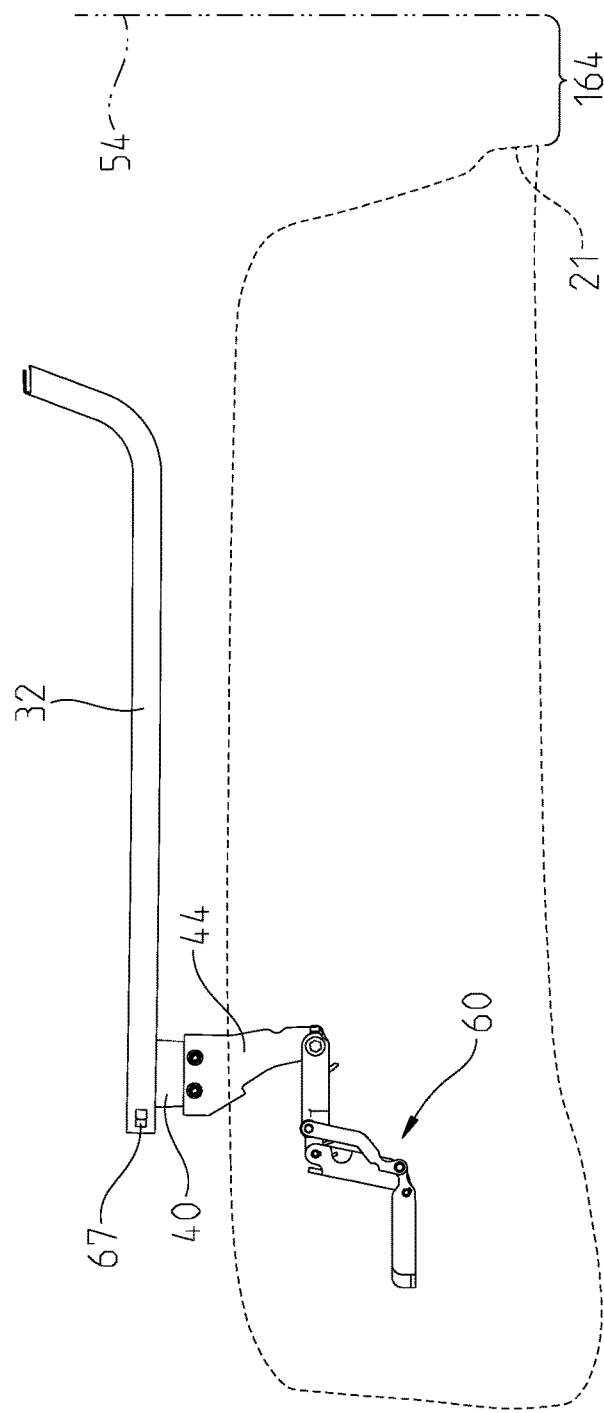
FIG. 10 illustrates a diagrammatic top view of an over-travel door hinge located at an end of travel of a door track.

FIG. 9 illustrates the prior art hinge of FIG. 3 located at the stop 67 of the rail 32. This is a top view of the hinge 46 and shows the location of the edge 22 of the door 20 aligned with the location 54, also illustrated in FIG. 2. FIG. 10, in contrast, illustrates the extendable hinge 60 of the present disclosure and the additional travel distance of the door 20 provided along the track 32. While the bracket support 44 is prevented from moving further along the rail by the stop 67, the extendable hinge 60 in the fully deployed condition provides additional movement of the door 20 along the body 12 of the vehicle 10. The edge of the door 21 is therefore moved away from the location 54 to provide an additional space 164. The opening 22 is thereby increased in size to provide additional room for entry into and out of the vehicle 10.

Figure 11:
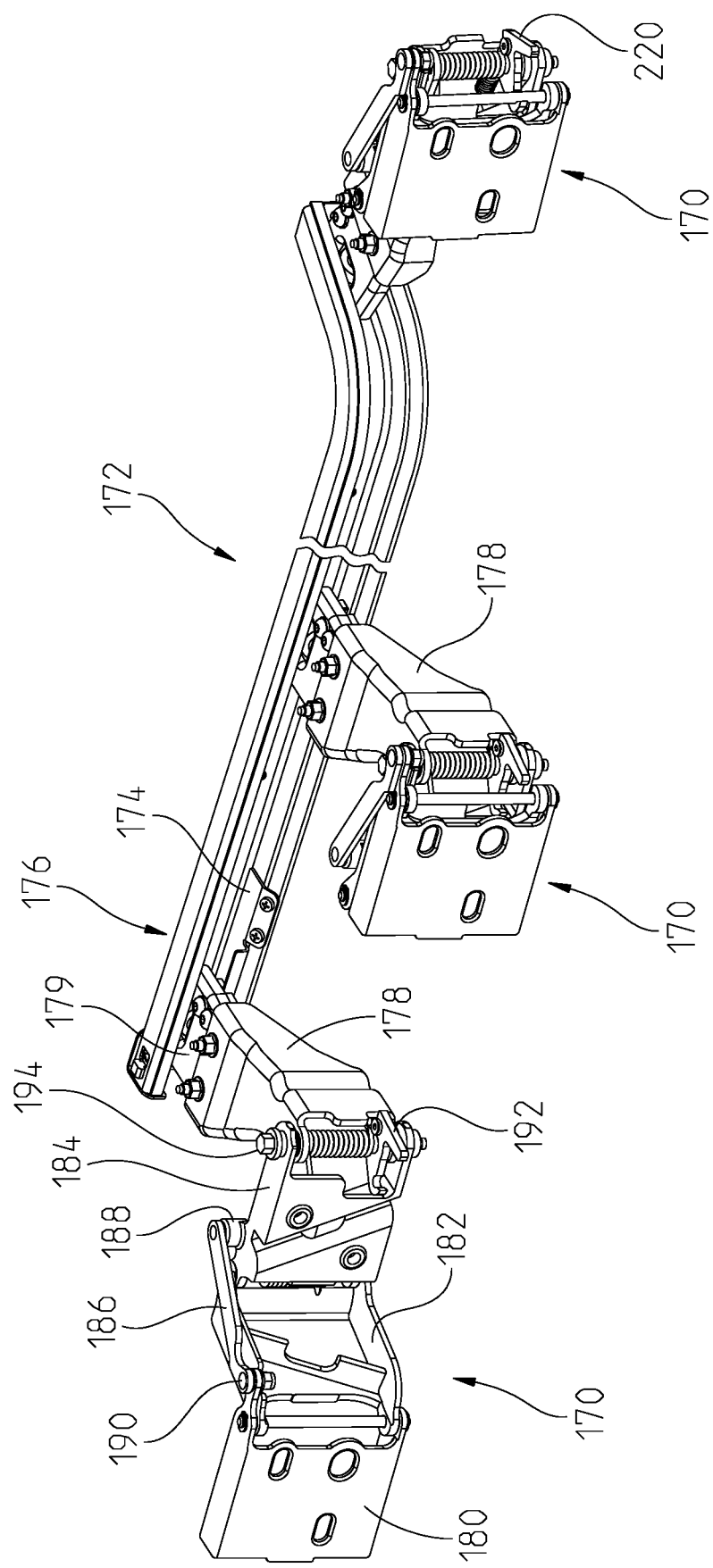
FIG. 11 illustrates a perspective view of an extendable hinge in a first, second, and third position with respect to a door track.

FIG. 11 illustrates a perspective view of another embodiment of an extendable hinge 170 in a first, second, and third position with respect to a door track 172. In this embodiment, the door track includes a track flange 174 which is operatively connected to the door track 172 at an end 176 at which the hinge 170 is fully extended. The track flange 174 provides increased strength to the OEM track and provides additional stability of the door. In this embodiment, the hinge 170 includes a bracket support 178 which has been modified to engage the door track 172 and in particular to engage the flange 174. The bracket support 178 includes a first part 179 configured to engage the track flange 174.

The hinge 170 includes a first bracket 180 coupled to a second bracket 182 which is in turn coupled to a third bracket 184. An arm 186 is pivotably coupled to and extends between the second bracket 182 and the third bracket 184. The arm 186 has been modified when compared to the arm 94 of the prior configurations to accommodate a connector 188 which is supported by the third bracket 184. In this embodiment, the arm 186 includes a relatively straight configuration between the connector 188 and a connector 190 located on the second bracket 182. A latch 192 is located at a pin 194 which couples the third bracket 184 to the bracket support 178.

Figure 12:
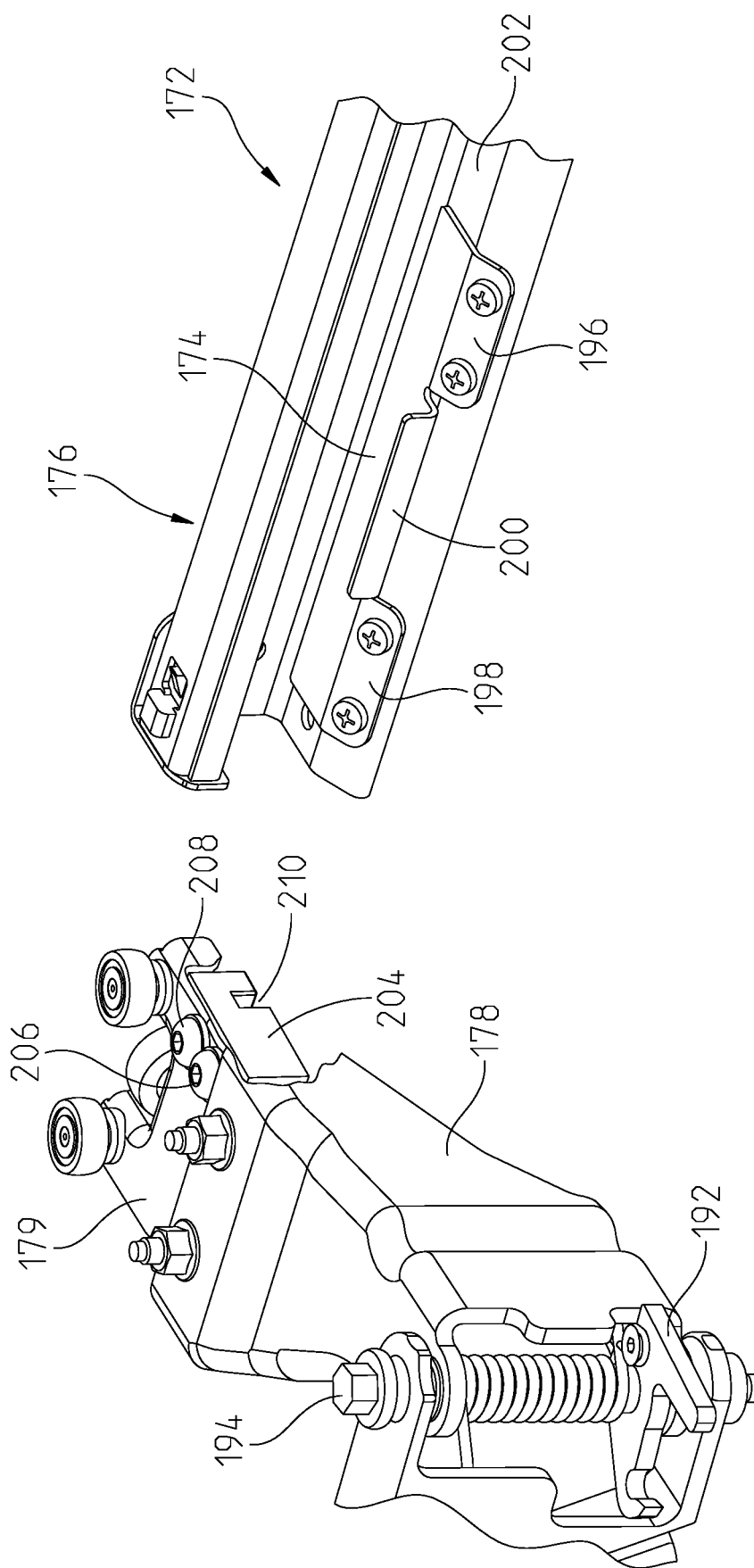
FIG. 12 illustrates a perspective view of a portion of a door hinge configured to engage a door track having a door track support.

As seen in FIG. 12, the flange 174 includes a first end 196 and a second end 198 each of which are fixedly coupled to the track 172. A center section of the flange 174 includes an upstanding portion 200 which extends upwardly away from a bottom 202 of the track 176. A retention block 204 is fixedly coupled to the first part 179 with a first fastener 206 and a second fastener 208.

Figure 13:
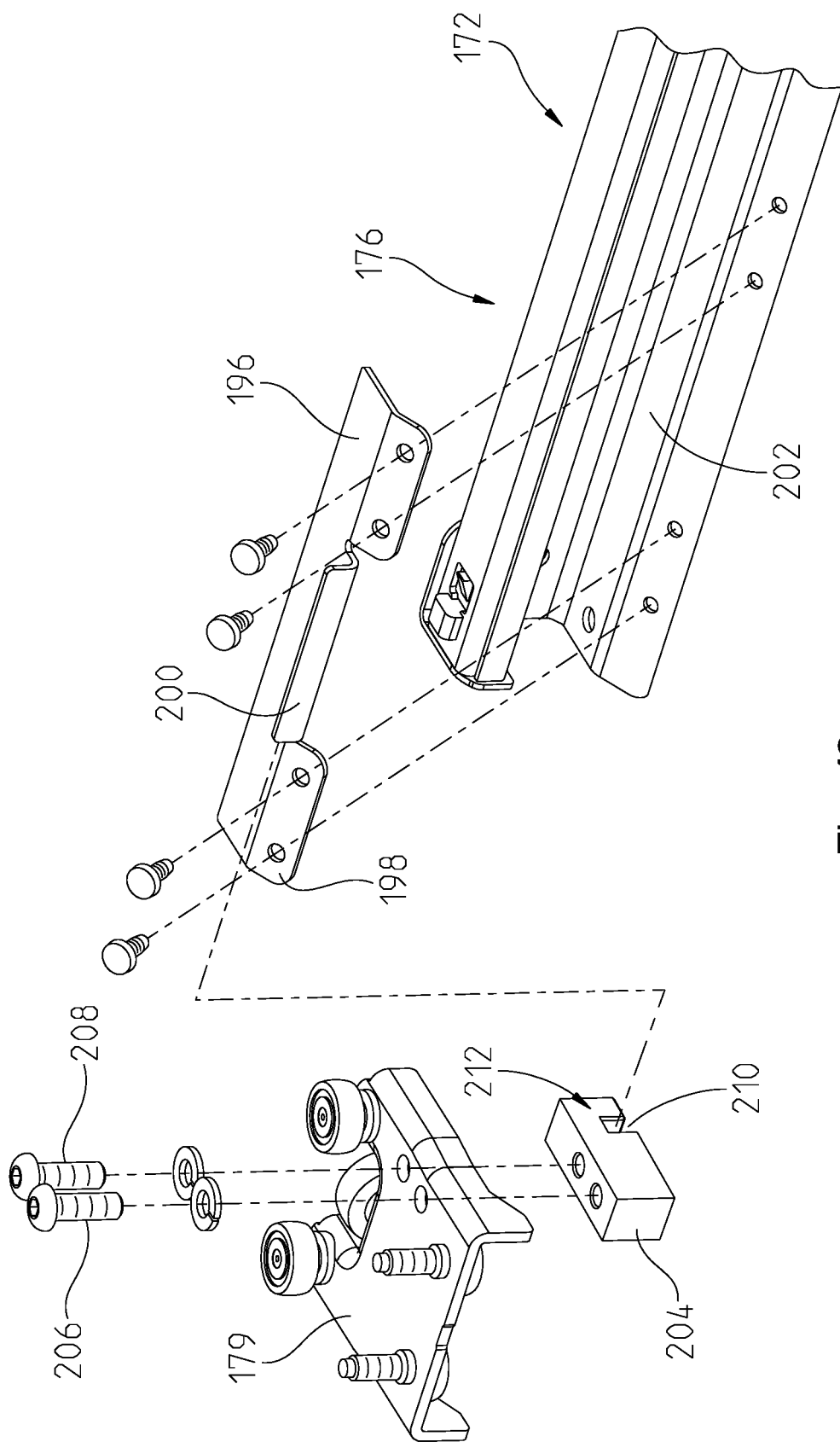
FIG. 13 illustrates a perspective view of a portion of a door hinge including a retaining block and a door track including a retention flange.

As further illustrated in FIG. 13, the retention block 204 includes a channel 210 which extends from a first side 212 to a second side (not shown) of the retention block 204. The channel 210 includes a dimension sufficient to accommodate the width of the upstanding portion 200, such that the retention block 204, and therefore the hinge 170, moves along the track flange 174. The internal dimension of the channel 210 is sufficiently sized to permit movement of the block 204 along the portion 200 without excessive binding, while not being too loose. The retention block 204, in combination with the flange 174, reduces an amount of deformation to the track 172 which can result from the weight of the door as it travels along the track 172.

Figure 14:
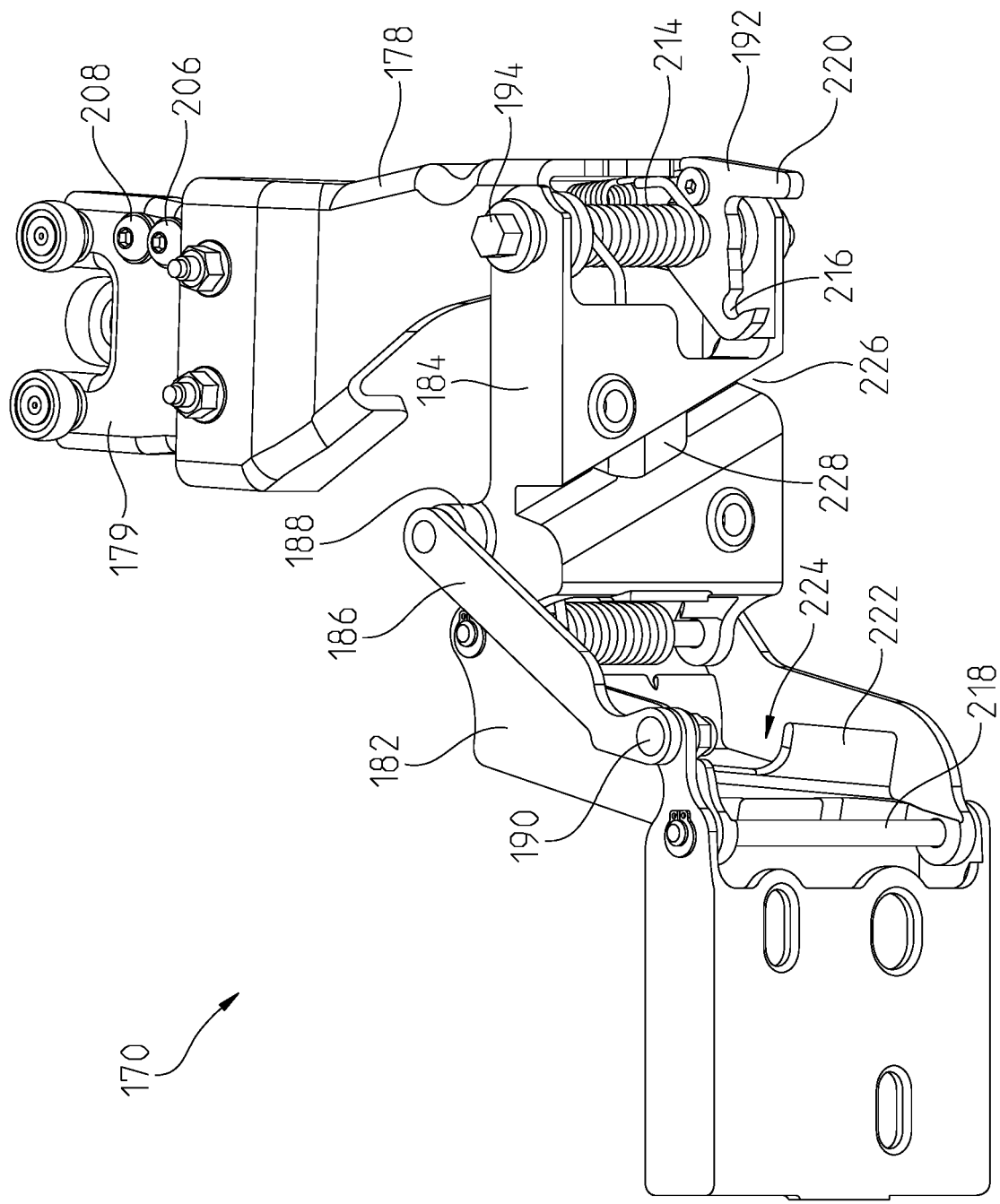
FIG. 14 illustrates a perspective view of a door hinge including a latch.

FIG. 14 illustrates a perspective view of a portion of the door hinge 170 including the latch 192. The latch 192 is spring biased about the pin 194 by a spring 214. The latch 192 is biased in a counterclockwise direction as shown in FIG. 14. The latch 192 includes a notch 216 having a predetermined size which is sufficient to capture a pin 218 when the hinge 170 is in the closed position. The latch 192 further includes a leg 220, which is spaced from the notch 216, and which extends away from the pin 194.

When the hinge 170 is in the closed position and the door of the vehicle is completely closed, the pin 218 is located within the notch 216 of the latch 192. In this position, the leg 220 extends toward the door and provides additional leverage for opening the door from the closed position and moving the door to a partially open state. The leg 220 contacts the original equipment door upon rotation of the hinge 170 and pushes the hinge 170 to disengage the notch 216 from the pin 218. As the leg 220 continues to contact the door, the hinge 170 is forced open by a small amount which reduces the force necessary to move the door from the closed position to the open position.

As further illustrated in FIG. 14, the second bracket 182 includes a rib 222 which is inclined with respect to the top wall and the bottom wall of the bracket 182. In this embodiment, however, the rib 222 includes a centrally located cutout 224. The third bracket 184 includes an inclined recess 226 having a crosspiece 228, which extends across the inclined recess 226. As the hinge 170 is moved to close the door, the cutout 224 moves into close proximity with the crosspiece 228. Once the door is completely closed, the crosspiece 228 provides support for the rib 222 and consequently reduces any flex of the hinge 170 which can result from movement of the vehicle while the door is closed.

While exemplary embodiments incorporating the principles of the present invention have been disclosed herein, the present invention is not limited to the disclosed embodiments. Instead, this application is intended to cover any variations, uses, or adaptations of the invention using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this invention pertains and which fall within the limits of the appended claims.

The invention claimed is:

1. A method of opening a vehicle door that is coupled to an extendable hinge and moves along a track located along a side of the vehicle,
   wherein the track includes a first end at which the door is in a closed position and a second end at which the door is in an open position, the method comprising:
   moving the door forwardly with respect to the track to the closed position at the first end of the track, which includes coupling a latch of the extendable hinge to a pin of the extendable hinge at the closed position of the door;
   moving the door rearwardly with respect to the track by sliding the door along the track from the closed position at the first end of the track toward the second end of the track;

continuing to move the door rearwardly with respect to the track without further sliding movement of the door along the track at the second end of the track, which includes disengaging the latch from the pin at the second end of the track and unfolding the extendable hinge.

2. The method of claim 1, wherein the continuing step comprises extending the door from the track at the second end of the track without further sliding movement of the door to locate the door in the open position.

3. The method of claim 1, further comprising increasing a size of a door opening of the vehicle after sliding movement of the door along the track has stopped.

4. A method of opening a vehicle door of a motor vehicle, wherein the motor vehicle includes a body, and a track supported by the body and having a first and second ends, an extendable hinge, and a bracket support, the method comprising:

positioning the door in a closed position relative to the body at the first end of the track;

moving the door from the closed position to an open position at the second end of the track;

sliding the hinge along the track as the door moves from the first end to the second end; and unfolding the extendable hinge from a collapsed condition at the first end of the track where the door is in a closed position to a partially deployed condition at a position between the first and second ends, and to a fully deployed condition at the second end where the door is in the open position;

wherein movement of the extendable hinge to the fully deployed condition moves the door with respect to the body without further sliding movement of the extendable hinge along the track upon disengaging a latch from a pin.

5. The method of claim 4, further comprising:

providing the extendable hinge with a first bracket fixedly mounted to the door, a second bracket, and a third bracket;

rotating the third bracket relative to the bracket support; and rotating the second bracket relative to the first and second third brackets as the door moves from the closed position to the open position.

6. The method of claim 5, further comprising:

pivoting an arm of the extendable hinge relative to the first and third brackets;

wherein the pivoting step moves the extendable hinge from the fully deployed condition to the partially deployed condition as the bracket support moves from the second end of the track toward the first end of the track.

7. The method of claim 5, further comprising locating a rib of the second or third bracket in a recess of the other of the second or third bracket when the extendable hinge is disposed in the collapsed position.

\* \* \* \* \*